United States Patent [19]

Frazier

[11] Patent Number: 4,967,210

[45] Date of Patent: Oct. 30, 1990

[54] DRY TRANSFER LETTERING SYSTEM AND METHOD

[75] Inventor: Allen L. Frazier, Derby, Kans.

[73] Assignee: DP Tek, Inc., Wichita, Kans.

[21] Appl. No.: 411,303

[22] Filed: Sep. 22, 1989

[51] Int. Cl.⁵ ...................... G01D 15/00; B41J 29/367
[52] U.S. Cl. .................................. 346/150; 400/240.1
[58] Field of Search .................. 355/40 FP, 280, 281; 346/150, 160, 160.1; 400/240.1

[56] References Cited

U.S. PATENT DOCUMENTS

| | | | |
|---|---|---|---|
| 3,152,901 | 10/1964 | Johnson | 355/40 FP X |
| 3,921,318 | 11/1975 | Calavetta | 355/40 FP X |
| 3,924,728 | 12/1975 | Brown et al. | 400/240.1 X |
| 4,007,823 | 2/1977 | Barouh et al. | 400/240.1 |
| 4,710,047 | 12/1987 | Barouh et al. | 400/240.1 X |
| 4,771,340 | 9/1988 | Notermans | 346/160 X |
| 4,781,481 | 11/1988 | Nagahamays | 400/240.1 X |
| 4,796,037 | 1/1989 | Takada et al. | 346/160.1 |

*Primary Examiner*—Donald A. Griffin
*Attorney, Agent, or Firm*—Hovey, Williams, Timmons & Collins

[57] ABSTRACT

An improved method and apparatus for the creation and application of visual images such as textual characters is provided, which preferably makes use of a digital computer (12) and laster printer (16). In the perferred method, a desired image is developed using the computer (12), typically with specific selection of font style, image orientation and size of characters; the final image is then printed using printer (16) on a substrate (18) presenting a release surface (20). An image-removing web (22) is then applied over the printed image, causing the printed image to adhere to the web (22). The web (22) is then stripped from the substrate (18) and can be applied to any selected support surface.

12 Claims, 1 Drawing Sheet

Microfiche Appendix Included
(351 Microfiche, 4 Pages)

DRY TRANSFER LETTERING SYSTEM AND METHOD

REFERENCE TO MICROFICHE APPENDIX

A microfiche appendix disclosing the preferred computer program for use in the present invention has been submitted The program listing is in source code. Accompanying the program are the program Instruction Guide and version 1.1 addendum thereto. The appendix consists of four microfiche bearing 351 frames, including targets.

BACKGROUND OF THE INVENTION

1. Field of the Invention

The present invention is broadly concerned with a method and apparatus for creation of desired images such as textual characters, designs, logos and borders, and for applying such images directly to a specific surface. More particularly, it is concerned with such a method and apparatus which makes use of a programmable computer having an electrostatic printing means (e.g., a laser printer) operably coupled thereto; input representative of a desired image is entered into the computer and the characteristics of the input such as font type, spacing and size are selectively altered, whereupon the electrostatic printing means is operated to deposit image-defining material (e.g., toner) onto a release substrate. An image-removing adherent web is then applied over the printed image, the web bearing the image is then stripped from the substrate, and the web is then applied to a desired support surface.

2. Description of the Prior Art

Individuals wishing to create technical proposals, blueprints, drawings, charts, labels, file folders and other types of visually perceivable data often wish to create a professional-looking appearance in their products. Traditionally, the only way to achieve this result was to employ the services of a professional printing service. This is generally a time-consuming and expensive proposition, particularly when only a small number of printed items need to be prepared.

In recent years the concept of "desk top publishing" has come into vogue, by virtue of rapid advances in the capabilities of small computers and their associated printers. Desk top publishing systems permit production of small numbers of professional-quality printed items, but are limited in that they are not designed to produce labeling or other images which can be applied to a variety of support surfaces. Therefore, a person desiring to create a textual heading for application to a notebook for example, has no way of readily employing desk top publishing technology in a manner to create a professional-looking notebook.

SUMMARY OF THE INVENTION

The present invention overcomes the problems outlined above, and provides a method and apparatus particularly adapted for the creation of images of all kinds which can then be applied to a multitude of different support surfaces. Broadly speaking, the method of the invention comprises the steps of providing a substrate presenting a release surface, and depositing image-defining material such as ink or toner onto the release surface in a pattern to form a desired image. Thereafter, an image-removing adherent web is applied to the release surface and over and in contact with the deposited image defining material. The web is then removed from the release surface with the image-defining material adhered thereto in the desired pattern. The web may then be secured to a selected surface in order to create the desired display thereon.

The method of the invention is particularly suited for use with a digital computer operably coupled with electrostatic printing means such as a laser printer. In such a situation, the operator simply inputs desired information into the computer which is representative of a desired image, and then, through an appropriate computer program, alters the characteristics of the image as desired. Finally, the printing means is actuated so as to deposit image-defining material on the release surface substrate in accordance with the input as selectively altered.

Alternately, use can be made of a xerographic copier in lieu of the computer/printer combination. In this case though, the ability to readily alter the characteristics of the desired image is vitiated.

Pursuant to the invention, a kit for image creation and application is also provided. Such a kit includes a substrate presenting a release surface, as well as computer program storage means having an operating program stored thereon for a digital computer. The program is operable for receiving input representative of a desired image, selectively altering the characteristics of the image, and operating the printing means to deposit image-defining material on the release surface in accordance with the input as altered. The kit further includes an image-removing adherent web, which is characterized by the property of having a greater affinity for the deposited image-defining material than the release surface of the substrate. Preferably, the computer storage program means is in the form of a floppy disk, whereas the substrate is advantageously one of the number of known heat transfer release papers. The adherent web may simply be conventional household transparent tape.

DESCRIPTION OF THE PREFERRED EMBODIMENTS

An imaging kit in accordance with the present invention preferably includes a supply of release substrates in the form of treated paper. Known transfer papers heretofore used for printing heat applied transfers are suitable for this purpose. The most preferred heat transfer release paper is commercialized by Union Ink Company, Inc. of Ridgefield, New Jersey, under the designation Trans-French T-75." This release paper is described as a non parchment, stable white paper which works well for multicolored designs with minimal paper shrinkage. The paper is further described as being excellent for screen printing, lithography and hot-peel and cold-peel heat transfers. Alternately, other known types of release substrates can also be employed.

The overall kit of the invention further includes a supply of adherent web. Most advantageously, the web is simply a common household adhesive or "cellophane" tape commercialized by a number of sources such as the 3M Company of Minneapolis, Minn. Such tape is normally provided in various widths and transparencies.

In order to assist in the method of the invention, the kit may also include an elongated burnishing stylus presenting a flattened end which can be rubbed across the tape in order to ensure complete adherence of deposited image onto the tape.

Finally, the preferred kit of the invention includes a computer program adapted for use with a digital computer. The program is designed to receive input representative of a selected image, and to selectively alter the characteristics thereof. For example, in the case of textual characters, the program is designed to permit selection of font, orientation, spacing and size of the individual characters. In addition, special effects such as border boxes or underlining may be added through use of the program. Finally, the program is operable to actuate an electrostatic printer coupled with the computer so as to print the desired textual characters, with special effects, on a sheet of release paper or other substrate.

Although a number of existing computer programs can be used in accordance with the invention, the most preferred program is that entitled "3-2-1 Liftoff", commercialized by DP-Tek, Inc. of Wichita, Kans. Pursuant to Patent and Trademark Office Rule 1.96, the aforementioned computer program, together with the associated Instruction Guide and Version 1.1 addendum, has been submitted as a microfiche appendix; such information is incorporated by reference herein and is deemed to be a part of this specification.

Figure 1:
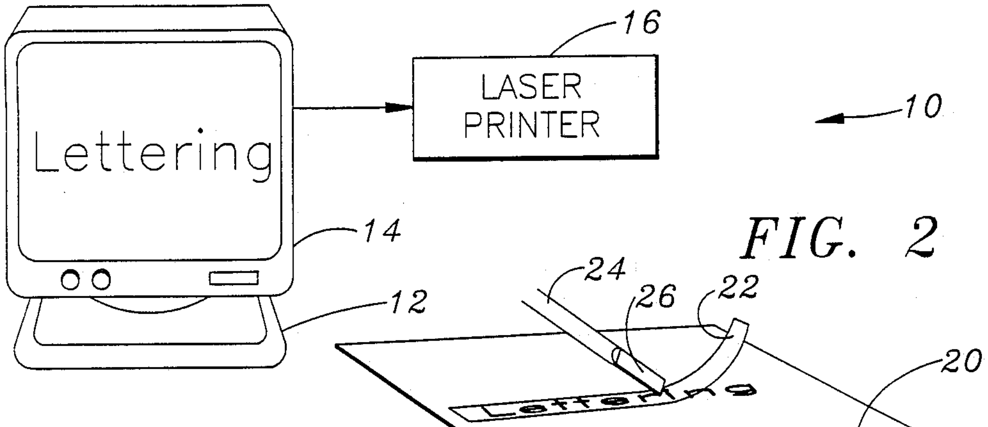
FIG. 1 is a schematic representation of the preferred computer/laser printer apparatus useful in the of the present invention.

Turning now to the drawing, preferred apparatus 10 for use in practicing the present invention is illustrated in FIG. 1. Apparatus 10 includes a digital computer 12 having a CRT screen 14, as well as a laser printer 16. The latter is coupled by conventional means to the computer 12.

Although the computer/laser printer apparatus is most preferred, those skilled in the art will realize that, broadly speaking, apparatus useful in the invention should include input means for receiving an input representative of a desired image, and an output means for depositing the image-defining material onto the release substrate. Accordingly, and pursuant to these dictates, different kinds of equipment may be useful, such as a xerographic copier.

In actual practice, the "3-2-1 Liftoff" software or other appropriate graphics software is loaded into computer 12, whereupon input information is entered into the computer via a keyboard or other conventional means. In the representative example depicted in the drawing, the word "Lettering" is entered into the computer and is displayed on screen 14. Thereafter, and using the preferred program, the font style, orientation, size and spacing of the characters can be selectively altered, and special effects may be added. The specific operating steps for the preferred "3-2-1 Liftoff" program are set forth in the instruction and addendum forming a part of the microfiche appendix.

Figure 2:
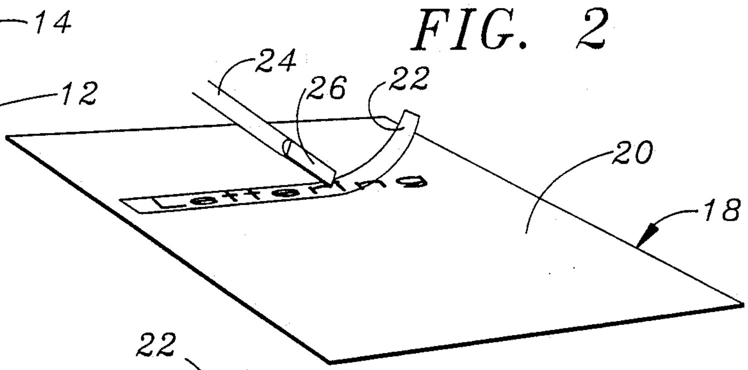
FIG. 2 is a perspective view illustrating the application of an adherent web over previously laser printed text on a release substrate, in order to cause the deposited toner from the laser printer to adhere to the web.

After the user has altered the "Lettering" characters as desired, the computer 14 is actuated to initiate the operation of laser printer, the latter having been loaded with the preferred heat transfer release paper. Referring to FIG. 2, a sheet 18 of the release paper having release coating 20 thereon has been imprinted with the word "Lettering." In the specific example under discussion, the image-defining material is of course the toner applied by the laser printer.

The user next detaches a strip of adhesive tape 22 from a supply roll and applies the same over the printed word "Lettering." In order to ensure that the applied toner adheres to the tape, use is made of stylist 24 having a flattened end 26. In particular, after the tape is applied the user simply burnishes the face of the tape 22 remote from the adherent face thereof by rubbing flattened end 26 across the applied tape.

Figure 3:
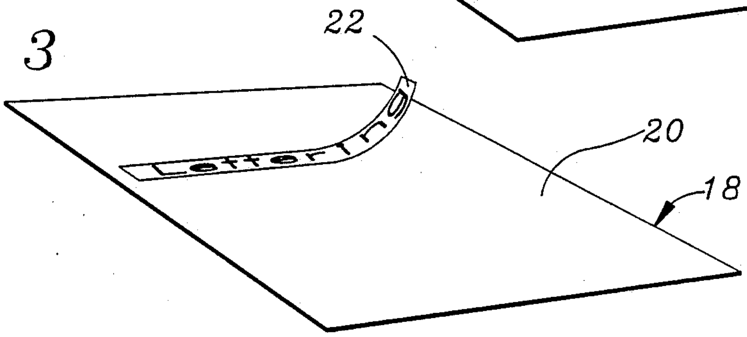
FIG. 3 is a perspective view similar to that of FIG. 2 but illustrating the step of stripping the adherent web from the release substrate, with the printed text adhering to the web.

FIG. 3 illustrates the step of removing the tape 22 from sheet 18, such being accomplished simply by lifting the tape and separating it from surface 20. As shown, the printed word "Lettering", originally applied to surface 20, adheres to the tape 22 and is lifted from the surface 20.

Figure 4:
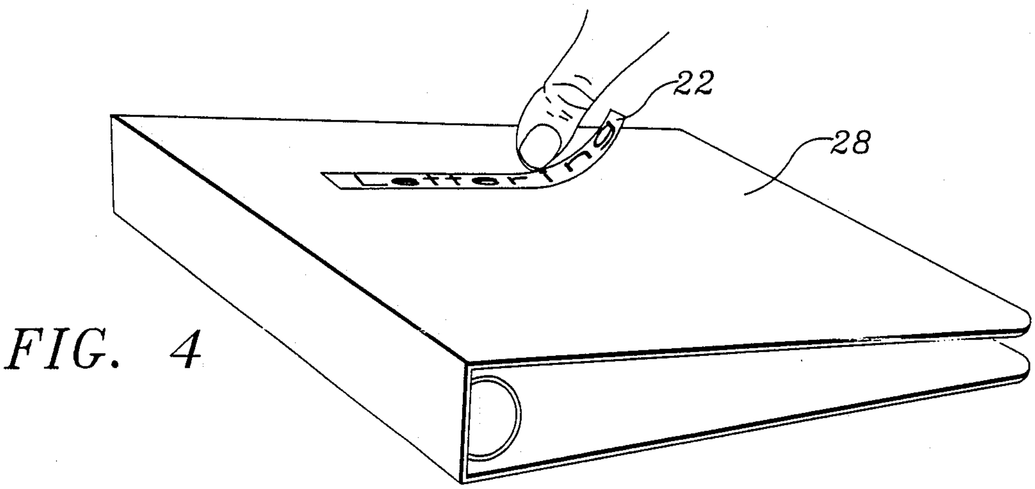
FIG. 4 is a perspective view depicting application of the adherent web bearing the printed text onto the cover of a notebook.

The final step of the method is shown in FIG. 4 wherein a notebook 28 serves as the support surface for the tape 22. As seen, the tape bearing the word "Lettering" is simply manually applied to the cover of notebook cover 28 in an appropriate location.

Those skilled in the art will appreciate that the principles of the invention may be employed in the production of a virtually unlimited variety of different images, comprising textual characters, symbols, logos, borders and other special effects. Likewise, the created images may be applied in many different contexts, limited only by the imagination of the user.

I claim:

1. A method of creating an image and applying the same to an image-bearing surface, said method comprising the steps of:

providing a substrate presenting a release surface;
depositing image-defining material on said surface in a pattern to form a desired, visually readable image thereon;
applying an image-removing adherent web to said release surface and over and in contact with said material, said web-applying step comprising adhesively securing and temporarily fixing said web to said release surface over and in surrounding relationship with said material;
causing said material to adhere to said web;
removing said web from said release surface with said material adhered thereto in said visually readable image pattern,
said release surface being characterized by the property of having a lesser affinity for said material than said web; and
securing said web with said material adhered thereto to a selected image-bearing surface with said image being visually readable through said web.

2. The method of claim 1, said depositing step comprising depositing toner on said surface in said pattern through use of a laser printer.

3. The method of claim 1, including the step of burnishing the surface of said web remote from said material, after said web has been applied to said release surface, in order to cause said material to adhere to said web.

4. The method of claim 1, said substrate comprising heat transfer release paper.

5. The method of claim 1, said web comprising a strip of adherent tape.

6. The method of claim 1, said depositing step comprising the steps of:

providing apparatus including input means for receiving an input representative of desired image and output means for depositing said image-defining material onto said substrate in accordance with said input:

entering input representative of said desired image into said apparatus by way of said input means; and operating said output means to deposit said image-defining material onto said substrate in accordance with said input.

7. The method of claim 6, said apparatus comprising a digital computer operably coupled with a laser printer.

8. The method of claim 6, said apparatus comprising a xerographic copier.

9. The method of claim 1, said image including textual characters.

10. A kit for creating an image and for applying the same to an image-bearing surface, said kit being useable with a programmable computer having an electrostatic printing means operably coupled thereto, said computer having means operably coupled thereto, said computer having means for receiving and storing and operating program, and input means for receiving a selected input, said printing means being operable for receiving a substrate to be printed and for depositing image-defining material on the substrate, said kit comprising:

a substrate presenting a release surface;

computer program storage means having an operating program stored thereon for said computer in order to operate said computer for (1) receiving input representative of a desired image, (2) selectively altering characteristics of the desired image, and (3) operating said printing means to deposit image-defining material on said release surface in accordance with said input as selectively altered, so as to create a final image on said substrate; and an image-removing adherent web which is substantially transparent when applied to said surface and which includes adhesive on one face thereof for adhesively securing and temporarily fixing the web onto said release surface, said adhesive serving to lift image-defining material from said release surface, said release surface being characterized by the property of having a lesser affinity for said image-defining material than said web.

11. The kit as set forth in claim 10, including a burnishing stylus.

12. The kit as set forth in claim 10, said computer program storage means comprising a floppy disk.

* * * * *